Figures 11, 12:
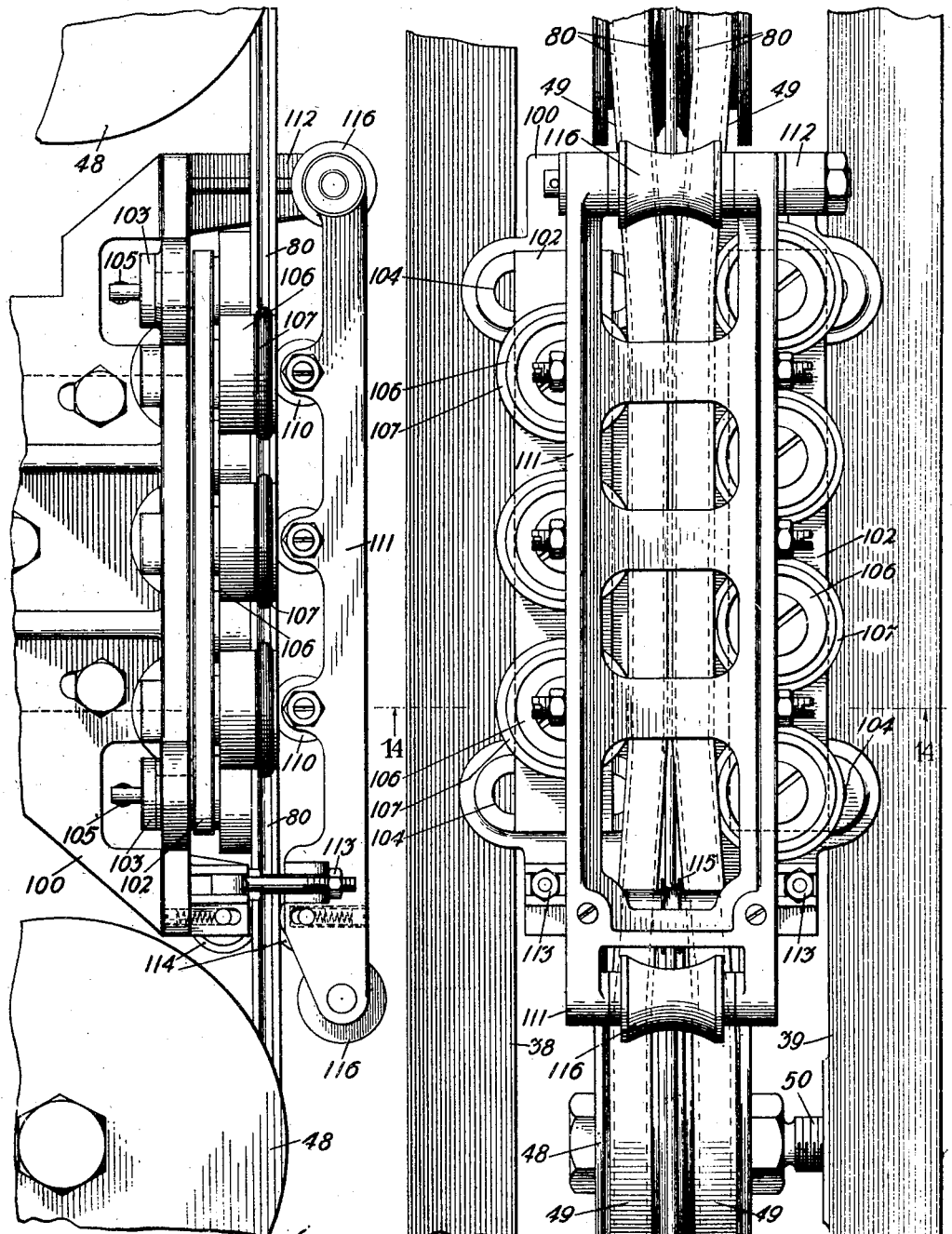

W. F. SMITH.
TWISTING MACHINE.
APPLICATION FILED OCT. 3, 1913.
1,104,078.
Patented July 21, 1914.
9 SHEETS—SHEET 1.
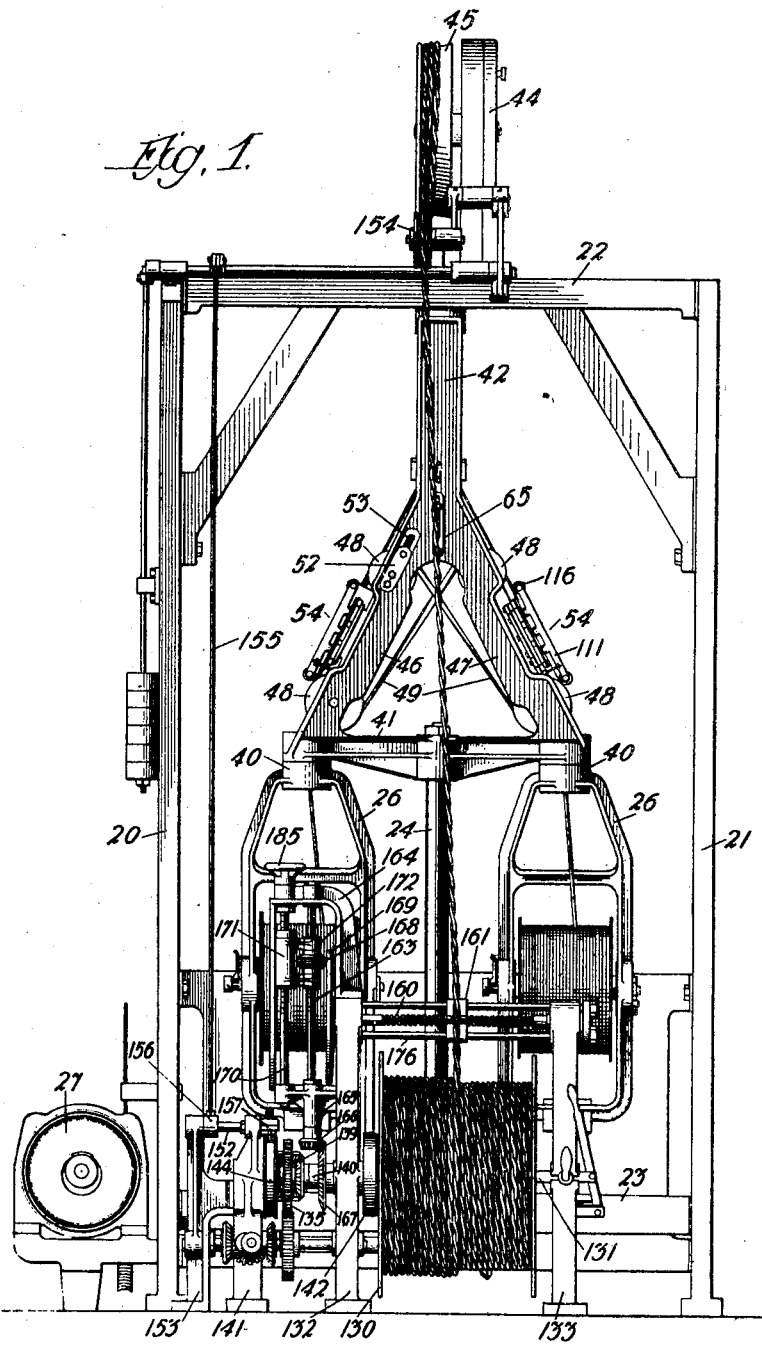

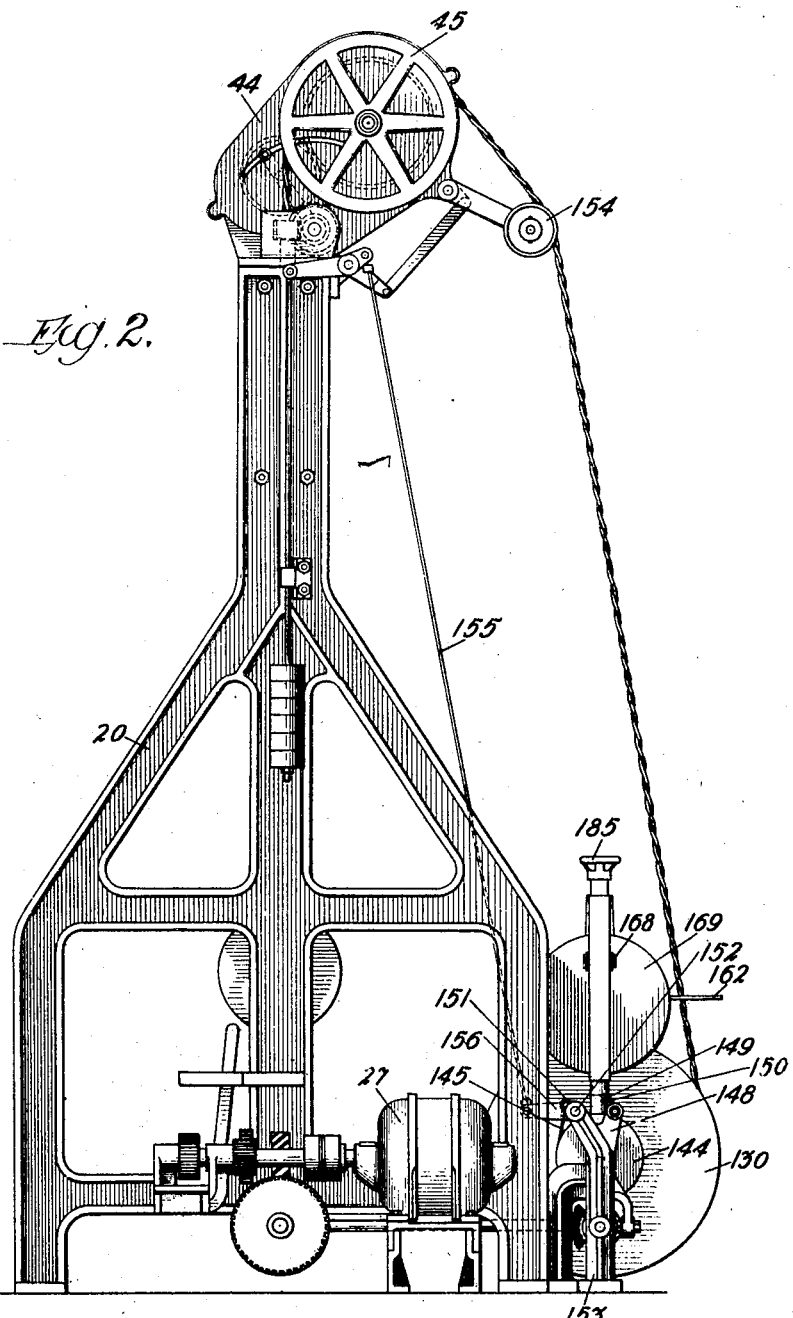

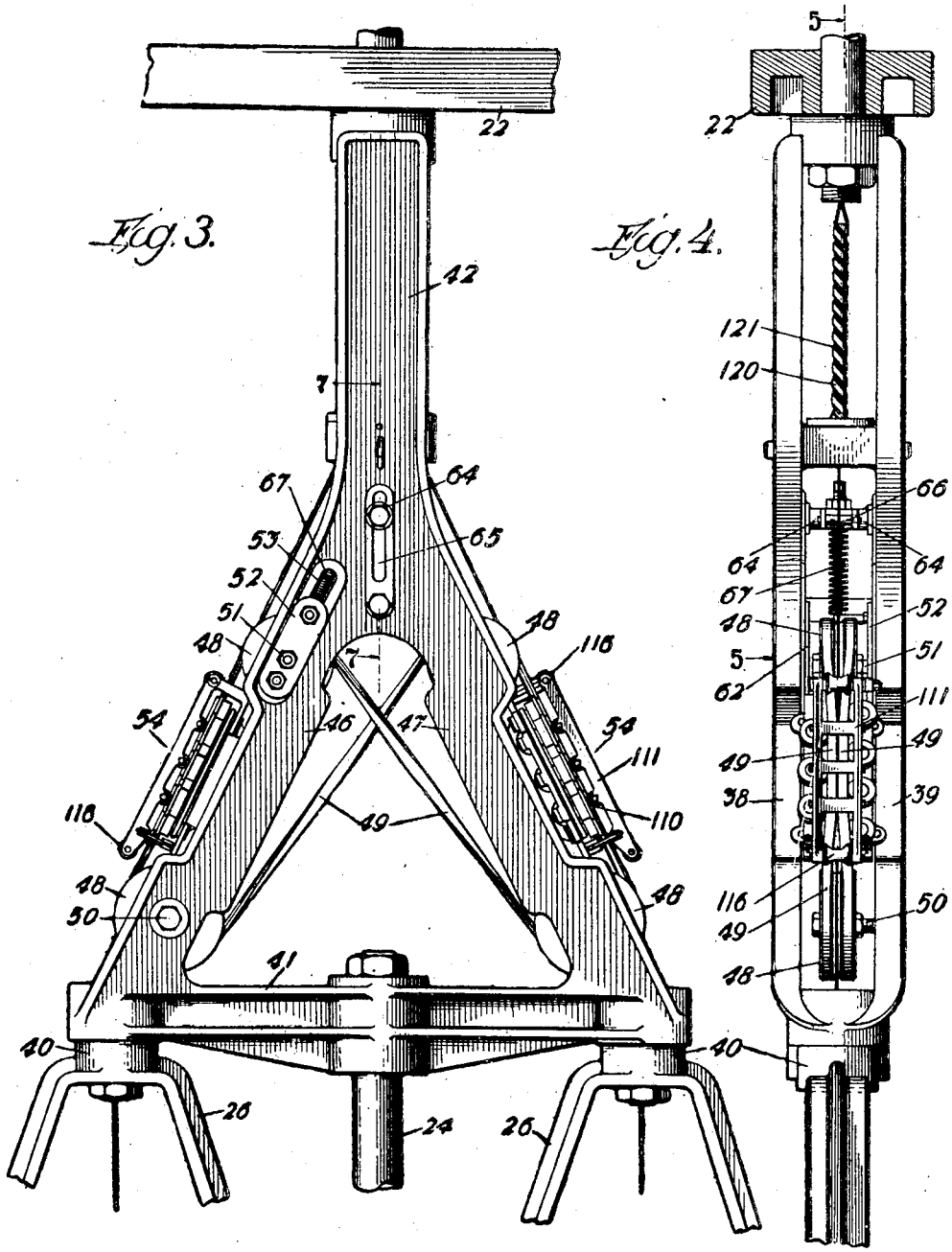

W. F. SMITH.,
TWISTING MACHINE.
APPLICATION FILED OCT. 3, 1913.
1,104,078.
Patented July 21, 1914.
9 SHEETS—SHEET 4.
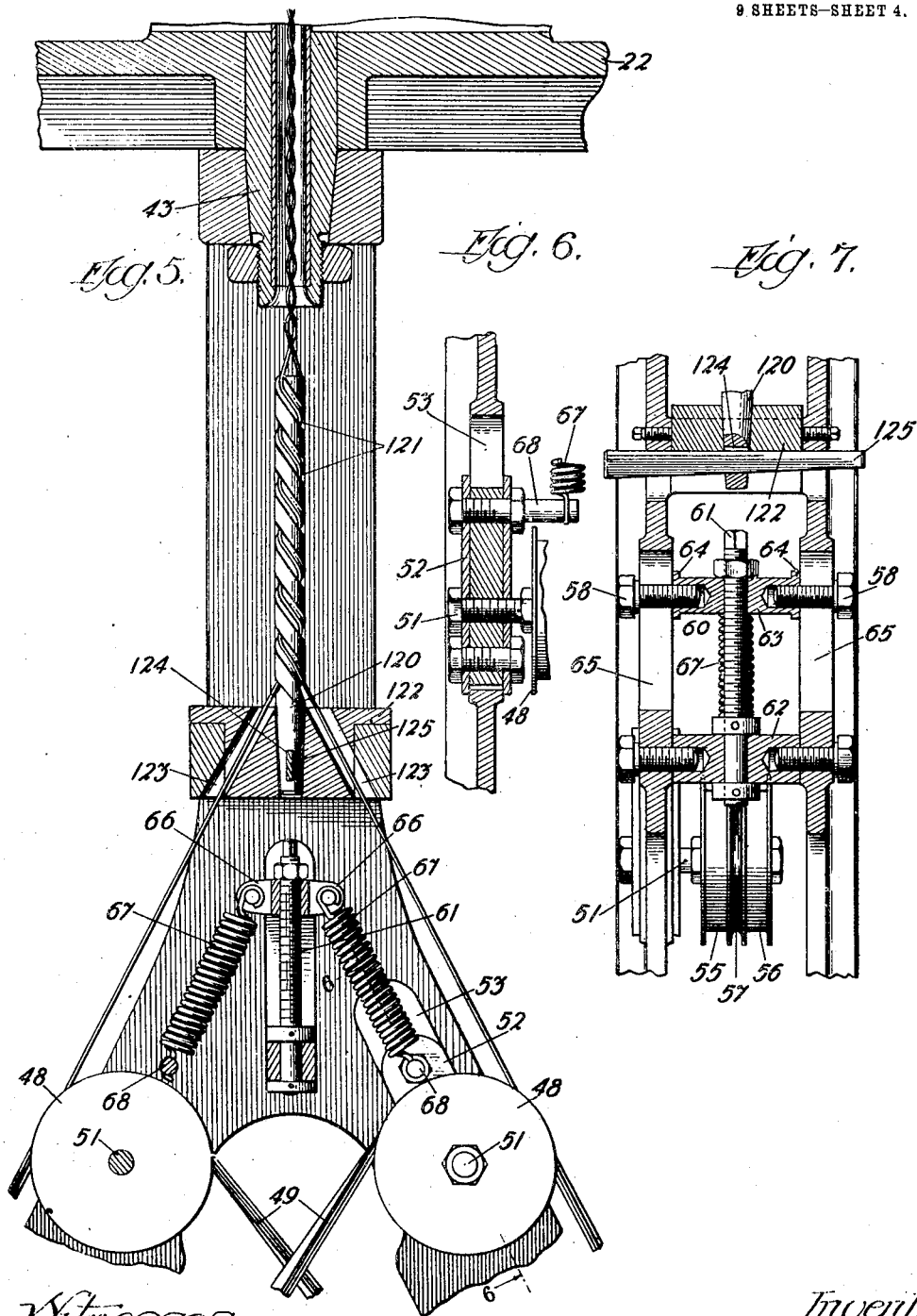

W. F. SMITH.
TWISTING MACHINE.
APPLICATION FILED OCT. 3, 1913.
1,104,078.
Patented July 21, 1914.
9 SHEETS—SHEET 5.
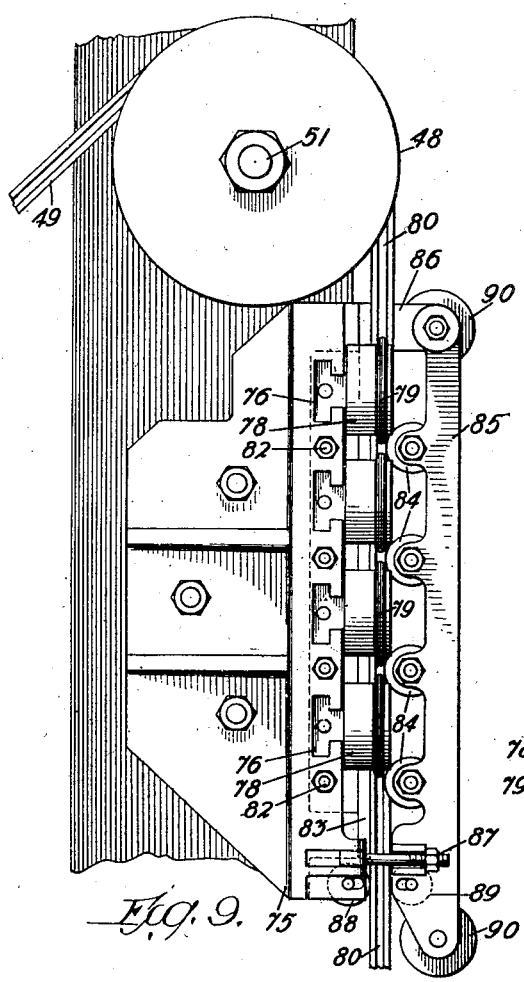
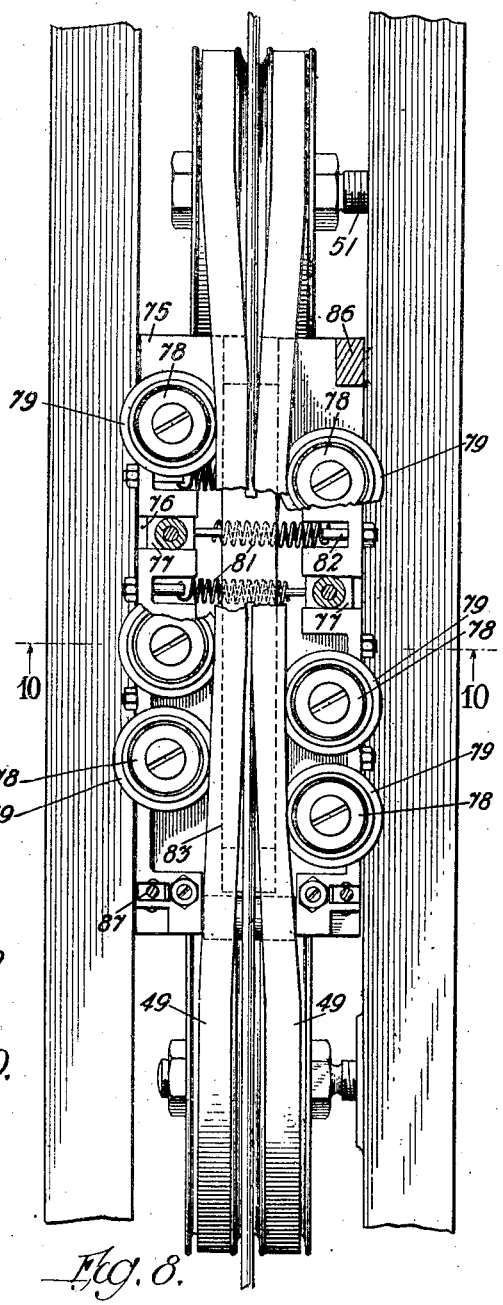
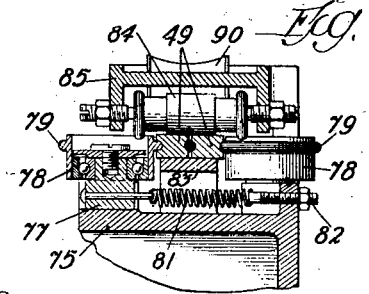
Witnesses:
Inventor
William F. Smith
By _____ Atty

W. F. SMITH.
TWISTING MACHINE.
APPLICATION FILED OCT. 3, 1913.

1,104,078.

Patented July 21, 1914.
9 SHEETS—SHEET 6.

Witnesses  Inventor
William F. Smith
By
Atty

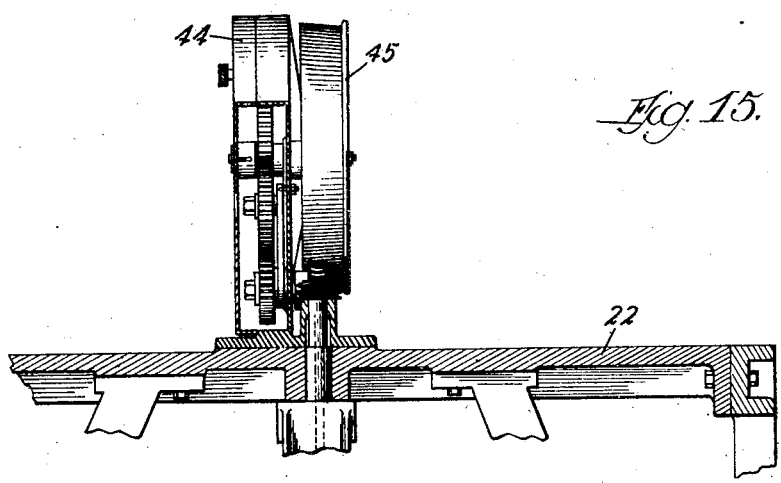
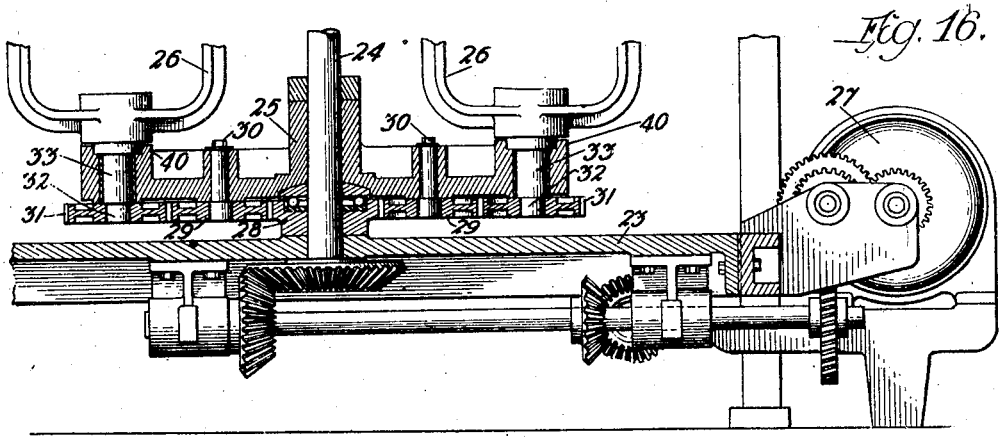
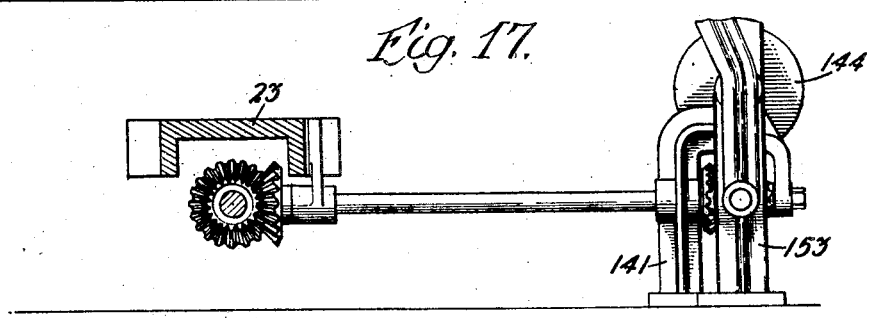

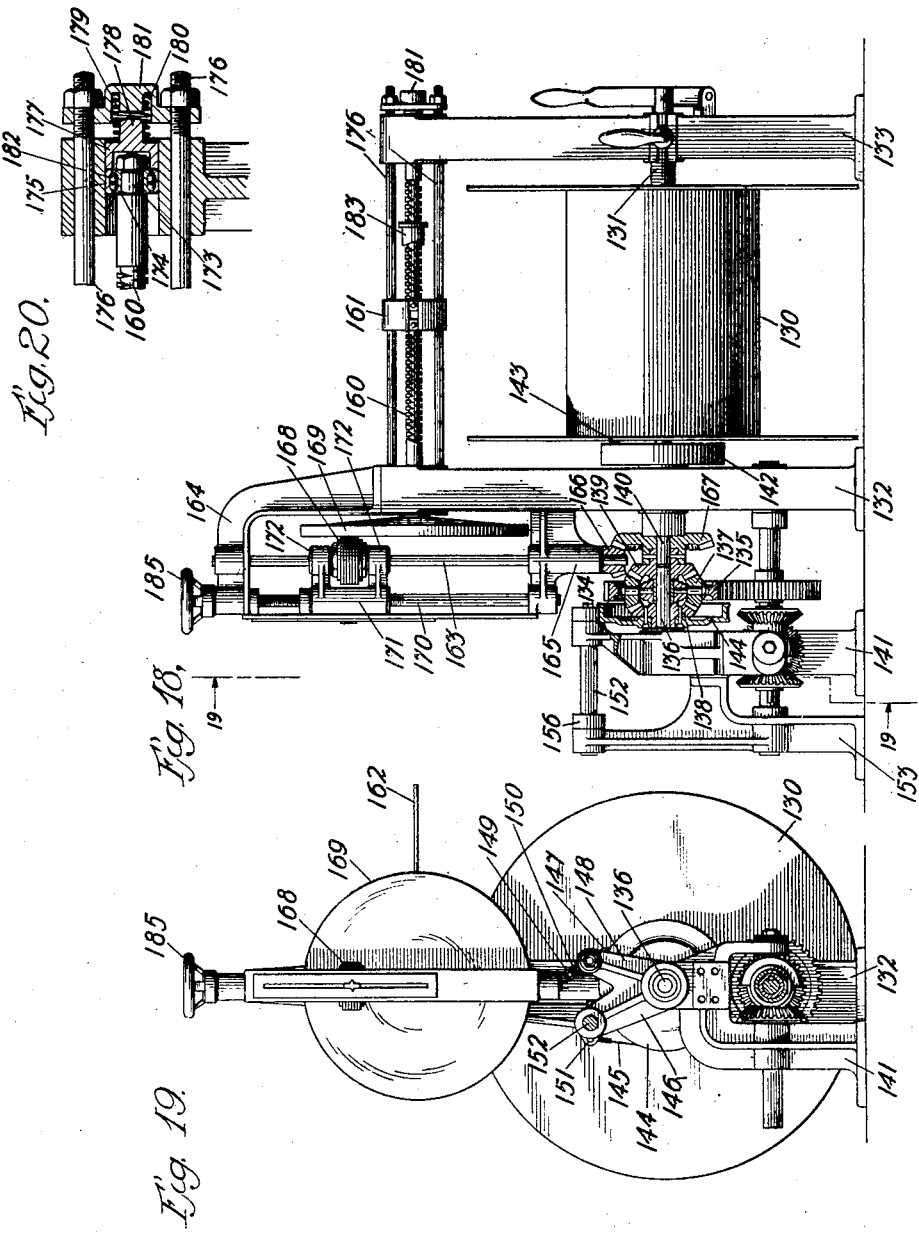

UNITED STATES PATENT OFFICE.

WILLIAM F. SMITH, OF CHICAGO, ILLINOIS, ASSIGNOR TO WESTERN ELECTRIC COMPANY, OF NEW YORK, N. Y., A CORPORATION OF ILLINOIS.

TWISTING-MACHINE.

1,104,078. Specification of Letters Patent. Patented July 21, 1914.

Application filed October 8, 1913. Serial No. 793,128.

*To all whom it may concern:*

Be it known that I, WILLIAM F. SMITH, a citizen of the United States, residing at Chicago, in the county of Cook and State of Illinois, have invented a certain new and useful Improvement in Twisting-Machines, of which the following is a full, clear, concise, and exact description.

This invention relates to twisting machines, and more particularly to machines for the twisting of flexible strands for use in cables or like articles of manufacture.

The object of this invention is to produce a machine for twisting a plurality of strands in a new and advantageous manner.

The features of this invention are the novel means provided for equalizing the speed of the strands to be twisted, the novel means provided for giving to the strands a uniform symmetrical twist, and other details of structure and combination of parts as will hereinafter more fully appear.

This invention is illustrated in the accompanying drawings in which the same reference characters are used throughout to designate the same parts, and in which—

Figure 13:
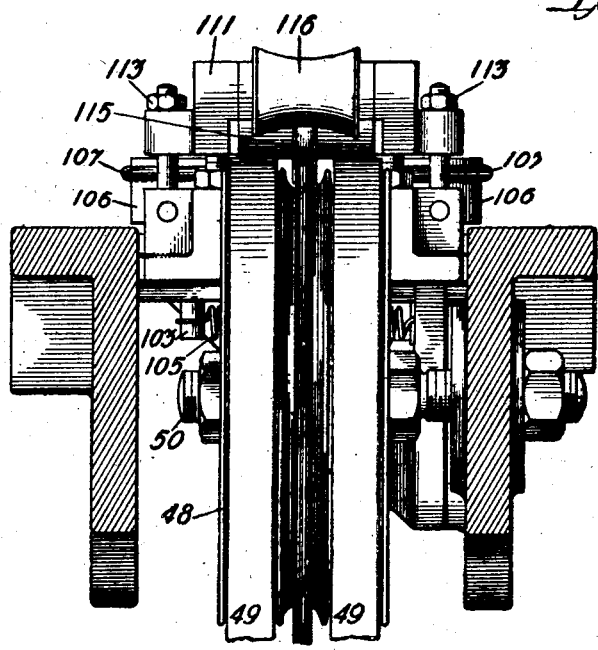
Figure 14:
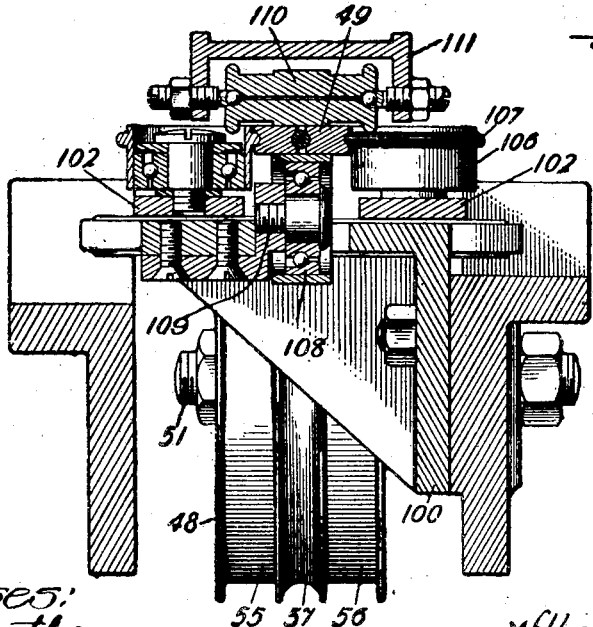

Figure 1 is a front elevation of a twisting machine embodying this invention; Fig. 2 is a side elevation of a twisting machine embodying this invention; Fig. 3 is a front elevation of a speed equalizing mechanism; Fig. 4 is a side elevation of the speed equalizing mechanism, and illustrating a grooved guide; Fig. 5 is a view partly in section on line 5—5 of Fig. 4; Fig. 6 is a view partly in section on line 6—6 of Fig. 5; Fig. 7 is a view partly in section on line 7—7 of Fig. 3; Fig. 8 is a front elevation of a pressure device, the cover frame therefor and several pressure rolls being removed to show more clearly the structure; Fig. 9 is a side elevation of the pressure device; Fig. 10 is a view partly in section on line 10—10 of Fig. 8; Fig. 11 is an elevation view of another form of pressure device; Fig. 12 is a side elevation of the pressure device shown in Fig. 11; Fig. 13 is an end view of the pressure device shown in Fig. 11; Fig. 14 is a view partly in section on line 14—14 of Fig. 11; Fig. 15 is a rear elevation of a capstan with a housing therefor partly broken away, and illustrating a driving mechanism for the capstan; Fig. 16 is a view illustrating the usual shafting and gears forming a connection between the motor and twisting machine; Fig. 17 is a view of the gearing between the main driving shaft and take-up mechanism; Fig. 18 is a front elevation of a take-up mechanism and a distributer screw therefor, and the gears for driving the take-up mechanism and distributer screw; Fig. 19 is a view on line 19—19 of Fig. 18; and Fig. 20 is a sectional view illustrating means provided for maintaining a positive and uniform drive for the distributer screw.

As shown in the drawings, this twisting machine comprises side frames 20 and 21, joined by top and bottom supports 22 and 23 respectively. Mounted upon the bottom support 23 is a revolving frame consisting of a vertical shaft 24 having secured thereto a supporting plate 25, in each end of which are journaled yokes 26, 26. The revolving frame is actuated by means of suitable motive power—such as a motor 27 through suitable gears and shafting shown in Fig. 16. In addition to revolving with the shaft 24 and the supporting plate 25, the yokes, 26, 26 may be arranged to revolve about their axes, but in reverse direction to the direction of rotation of the shaft 24. This is accomplished through the spur gear 28 secured to the shaft 24, idler gears 29, 29 secured to pins 30, 30 carried by the supporting plate 25 and spur gears 31, 31 secured to pinion extensions 32, 32 of the yokes 33, 33. Mounted upon hollow hubs 40, 40 of the yokes 26, 26 and the upper end of the shaft 24 is a triangular shaped frame 41 having an upper extension 42 which will hereinafter be more fully explained. To the upper end of the extension 42 of the triangular shaped frame 41 is attached a hollow shaft 43 journaled in the top support 22. Mounted upon the top support 22 is a housing 44 in which are mounted the necessary gears for driving a capstan 45 mounted upon said housing. The capstan 45, through the necessary gears, is driven from the hollow shaft 43. Since the arrangement of the gears for driving the capstan from the revolving frame is well known, it is not considered necessary to either show or describe them in detail. Legs 46 and 47 of the triangular shaped frame 41 and the upper extension 42 thereof, are bifurcated to form front and rear members 38 and 39, so as to provide for the mounting therein of the speed equalizing device and the grooved wire twister.

The speed equalizing mechanism comprises guide pulleys 48, 48 mounted on the triangular shaped frame in such a manner that their centers form the corners of an isosceles trapezoid, as shown in Fig. 3, and over which pass two endless grooved belts 49, 49. The margins of each belt 49 are provided with grooves 80, 80 of the size suitable for the size of strands to be twisted. These belts may be made of any suitable material—such, for example, leather, rawhide, rubber or rubber and canvas. The two lower pulleys are mounted upon pins 50, 50 secured to the triangular shaped frame 41, and the two upper pulleys are mounted upon pins 51, 51 secured to blocks 52, 52, slidably mounted in slots 53, 53 of the triangular shaped frame. The two pulleys upon the right-hand side of the machine are secured to the rear member 39 of the leg 47 on one side of the frame and the two on the left to the front member 38 of the leg 46. Between the pulleys upon the right-hand side and upon the same side of the triangular shaped frame is mounted a pressure device 54, while a similar pressure device 54 is similarly mounted between the two pulleys on the left. The pulleys and pressure device mounted upon the opposite legs of the frame 41 are supported upon opposite sides of their respective legs so that the belts may be readily changed without dismantling the twisting machine. The periphery of each of the pulleys 48, 48 is flanged to form thereon two distinct flat surfaces 55 and 56 over which the belts 49, 49 pass, and a groove 57 through which the strands to be twisted pass. In order that the belts may be kept taut, there is provided a tensioning means 60 comprising an adjustment screw 61 mounted upon a cross bar 62, supported between the two sides of the triangular shaped frame. The adjustment screw 61 carries a cross shaped adjustable member 63 having two of its ends 64, 64 in engagement with the sides of the frame, and engaged by locking bolts 58, 58 extending through slots 65, 65 in said frame. To the other two ends 66, 66 of the adjustable member 63 are secured springs 67, 67, the other ends of which are secured to pins 68, 68 carried by the sliding blocks 52, 52.

The pressure devices 54, 54 shown in Figs. 8, 9 and 10, are for the purpose of forcing the belts together to cause them to grip the strands as they pass through said devices. Each of these pressure devices comprises a bracket 75, in the top surface of which is provided a series of T-shaped slots 76, 76 extending alternately from each side of the bracket to the other side thereof, but not to the edge. Slidably mounted in each of these T-shaped slots 76 is a block 77 upon which is mounted a ball bearing roller 78 having a ridged surface 79 formed on the periphery thereof for engaging the grooves 80, 80 in the margins of the belts 49, 49, which pass between said rollers. In order that the belts may be forced together, a spring 81 is secured at one end to each block 77, and at its other end to an adjustable pin 82 carried by the opposite side of the bracket. In order that the position of the belts while passing through the pressure devices may be such that the inner grooves thereof register, a bar 83 is mounted on the bracket with its upper surface in contact with the lower faces of the belts. To still further aid in maintaining the proper position of the belts 49, 49, a plurality of rollers 84, 84 is mounted in a cover frame 85, pivoted to an extension 86 upon one end of the bracket 75. The other end of the bracket 75 is provided with locking mechanism 87 for securing the cover frame 85 to the bracket in such position that the rollers 84, 84 contact with the upper faces of the belts 49, 49. Slidably mounted in the lower end of the bracket 75 is a roller 88, and in one end of the cover frame 85 is slidably mounted a roller 89, said rollers 88 and 89 registering with the belts when the cover frame 85 is locked in position, thereby aiding in guiding the belts 49, 49 into the pressure device. In each end of the cover frame 85 is pivoted a guide roller 90, which guides the strands to be twisted when the pressure devices are not in use.

Another form of pressure device is shown in Figs. 11, 12, 13 and 14. This pressure device comprises a bracket 100, upon each side of which is mounted an adjustable plate 102, having a projection 103 near each end and on the under side thereof, which are slidably mounted in slots 104, 104 of bracket 100. A spring 105 is secured at one end to each of the projections 103 on one of the plates, and at its other end to the adjacent projection 103 of the other plate. Upon the plates 102, 102 there is mounted a plurality of ball bearing rollers 106, 106, having ridged portions 107, 107 formed on the periphery thereof for engaging the outer grooves 80, 80 of the belts 49, 49, and forcing said belts together due to the action of the springs 105, 105. In order that the position of the belts while passing through the pressure device may be such that the inner grooves 80, 80 thereof register, a plurality of ball bearing rollers 108, 108 is journaled on a plurality of pins 109, 109 carried by the bracket 100, and in such position that the flat rims thereof contact with the lower faces of the belts 49, 49. To still further aid in maintaining the proper position of the belts 49, 49, a plurality of rollers 110, 110 is pivotally mounted in a cover frame 111 pivoted to an extension 112 on one end of the bracket 100. The other end of the bracket 100 is provided with locking mechanism 113 for securing the cover frame 111 to the bracket 100 in such position that the rollers 110, 110 contact with the upper faces of the belts 49, 49. Slidably mounted in the end of bracket 100 is a roller 114, and another roller 114 is slidably mounted in the end of the cover frame 111, said rollers 114, 114 registering with the belts when the cover frame 111 is locked in position, thereby aiding in guiding the belts 49, 49 into the pressure device. On the periphery of each of these rollers 114, 114, there is provided a grooved flange 115 which registers with and guides the strands to be twisted into the pressure device. In each end of the cover frame 111 is pivoted a guide roller 116, which guides the strands to be twisted when the pressure devices are not in use.

Immediately above the speed equalizing mechanism, a grooved guide 120, provided with two spiral grooves 121, 121, is mounted in a chuck 122 supported by the sides of the triangular shaped frame 41. The chuck 122 is provided with two diagonally arranged openings 123, 123, for the passage of the strands to be twisted. The lower end of the grooved guide 120, is provided with a slot 124 into which fits a key 125 for locking said grooved guide 120 in the chuck 122.

The strands which have been twisted together, after passing over the capstan 45, pass on to a take-up reel 130 mounted upon a shaft 131 carried by a pedestal 133 and a face plate 142. Interposed between the take-up reel 130 and the usual driving mechanism therefor is a differential tension regulator 134 which maintains a uniform tension on the twisted strands as they are fed on to the take-up reel. This differential tension regulator 134 is an adaptation of the well known differential gear and comprises a main spur gear 135 mounted on a shaft 136 and within which are carried two pinions 137, 137, meshing with a bevel gear 138 loosely mounted on the shaft 136, and a bevel gear 139 fixed to one end of a shaft 140. The shaft 140 is journaled in the pedestal 132, and the shaft 136 in a pedestal 141 and the bore of the bevel gear 139. Upon the other end of the shaft 140 is mounted the face plate 142, carrying a pin 143 registering with a hole in the side of the take-up reel 130, whereby said take-up reel is caused to revolve with said shaft. The bevel gear 138 carries a brake pulley 144, around the periphery of which is a brake belt 145 for regulating the speed of the brake pulley 144. One end of the belt 145 is attached to the end of an arm 151 carried by a shaft 152 journaled in the upper end of a pedestal 153 and in the extension 146 of the pedestal 141 and the other end thereof terminates in an adjustment screw 147. The adjustment screw 147 passes through a hole in an arm 157 carried by an extension 148 of the pedestal 141 and carries an adjustment nut 149 near the end thereof. The adjustment screw 147 is encircled by a spring 150, one end of which rests against the adjustment nut 149 and the other end thereof against the arm 157 carried by the extension 148 of the pedestal 141.

Movement of the belt 145 on the brake pulley 144 is controlled by the twisted strands passing over an idler pulley 154 which acts through a system of bell crank arms and connecting rods which are shown very clearly in Figs. 1 and 2, and since said system of belt crank arms and connecting rods is well known and does not form any part of this invention, a detailed description thereof is considered unnecessary. Movement of said belt 145 is still further controlled by the action of the spring 150. The lower end of a connecting rod 155 of the system of bell crank arms and connecting rods is attached to an arm 156 secured to the shaft 152.

In order that the twisted strands may be evenly distributed on the take-up reel 130, there is provided a distributing means. This distributing means comprises a right and left-hand threaded distributer screw 160 having a distributer block 161 moving thereon, journaled in the pedestals 132 and 133. The block 161, which is held in proper position by the guide rods 176, 176, carries fingers 162, 162 for guiding the twisted strands. Adjustably mounted upon the distributer screw 160 is a reversing collar 183 for limiting the travel of the distributer block 161 in one direction and for reversing the movement thereof. The distributer screw 160 is provided with a variable speed drive, which comprises a shaft 163 journaled in an over-hanging bracket portion 164 of the pedestal 132, and in an extension bracket 165 secured to the pedestal 132. Mounted upon the lower end of the shaft 163 is a bevel pinion 166 meshing with the bevel gear 167 mounted on the shaft 140. Slidably mounted upon, but adapted to turn with the shaft 163, is a friction roller 168 contacting with a friction disk 169 carried by one end of the distributer screw 160. In order that the friction roller 168 may be moved in and out with respect to the center of the friction disk 169, an adjustment screw 170 is mounted in the overhanging bracket 164 and the extension bracket 165. Upon the adjustment screw 170 is carried an adjustment block 171 having extensions 172, 172 formed on the side thereof for embracing the shaft 163 upon each side of the friction roller 168. Secured to the upper end of the adjustment screw 170 is a hand wheel 185 for regulating the position of the friction roller 168 with respect to the center of the friction disk 169.

To insure intimate contact being made between the friction roller 168 and the friction disk 169, the outer end of the distributer screw 160 is recessed at 173 upon which recessed portion is fitted a ball bearing, comprising inner and outer rings 174 and 175 respectively, between which are placed two rows of balls 182, 182. Resting against the rim of the outer ring 175 is a cup-shaped thrust support 177 having a projecting portion 178 formed thereon. The distributer screw 160 is forced inwardly by the action of a spring 179, one end of which encircles the projecting portion 178 of the thrust support 177 and rests against said thrust support, and the other end of which rests in a cavity 180 formed in a thrust cap 181 supported by guide rods 176, 176. The position of the thrust cap 181 may be adjusted so as to regulate the tension of the spring 179.

Referring now to the operation of the twisting machine embodying this invention, a spool containing a strand to be twisted is mounted in an upright position in each of the yokes 26, 26 as shown in Fig. 1. Each strand is then led up through the hollow hub 40, over the groove 57 in the lower pulley 48, between the belts 49, 49 passing through the pressure device 54, over the groove in the upper pulley 48, through the hole 123 of the block 122 and into one of the grooves 121 of the grooved guide 120, these being located upon the respective sides of the revolving frame and the triangular shaped frame carried thereby. The two strands are then fed through the two grooves 121, 121 of the grooved guide 120, through the hollow shaft 43, around the capstan 45 several times, over the idler pulley 154, between the fingers 162, 162 of the distributer block 161 and on to the take-up reel 130. As the twisting machine is started, the revolving frame, capstan 45, take-up reel 130 and the distributer screw 160 begin to revolve. The capstan 45 draws the two strands through the speed equalizing mechanism and the grooved guide. As the strands pass through the speed equalizing mechanism, each is gripped by the two endless grooved belts 49, 49 due to the action of the spring pressed rollers associated with the respective pressure devices, and the speed of the strands is thereby equalized. The gripping of the strand by the belts will cause the travel thereof to be equal to that of the strands, assuming the tension on the rollers of the pressure device to be adjusted properly. If, therefore, one strand passes between the belts at a certain rate of speed, the belts will travel at the same rate and since the other strand is gripped by the same belts, it must necessarily travel at the same rate of speed as the belts and first mentioned strand; so that if one strand tends to run easy, due to lower tension on its spool, it will be prevented from running ahead due to the automatic action of the belts which, in a case of this kind, would be operated and driven by the strand under the greater tension, and tending to travel at a lower rate of speed. As the strands pass through the grooved guide, there is formed in each a definite spiral corresponding to the length of lay of the twist and the pitch of the groove. The pitch of both grooves is always made equal to the length of the lay of the twist desired in the twisted strands. The grooved guide insures that the strands which are drawn therethrough by the capstan, after the speed thereof has been equalized by the equalizing mechanism, will be twisted uniformly, both strands being at the same distance from the imaginary center line of the twisted strands, this being due to the surfaces upon which said strands are twisted being at the same distance from the center line of the grooved guide.

After the twisted strands have passed around the capstan several times, they pass over the idler pulley 154, through the fingers of the distributer block and then on to the take up reel 130. The spring 150 and the system of bell crank arms and connecting rods are adjusted for the tension which is desired on the twisted strands, the idler pulley 154 being in a definite position when the desired tension is on the twisted strands. As the take-up reel 130 is gradually filled with the twisted strands, the effective diamter thereof becomes greater, thereby increasing the tension of the twisted strands. An increase in the tension, however, causes the twisted strands to bear harder on the idler pulley 154 which thereupon acting through the system of bell crank arms and connecting rods, causes a downward movement of the connecting rod 155 and the arm 156 and a loosening of the belt 145 on the brake pulley 144. Any loosening of the belt 145 permits of an increase in speed of the brake pulley 144 causing, through the differential gears, a decrease in the speed of the take-up reel 130. Reduction of speed of the take-up reel 130 reduces the tension on the twisted strands, thereby permitting the idler pulley 154 and the bell crank arms and connecting rods to return to their normally adjusted positions. The spring 150 causes the change in speed of the take-up reel 130 to be gradual, and eliminates to a large degree the variation in the tension on the twisted strands to which they would otherwise be subject, due to any rapid changes in speed of the take-up reel. It will readily be seen that if due to any reason there should be a decrease of the tension on the twisted strands, the idler pulley 154 will be forced upward, thereby causing a tightening of the belt 145 and a consequent decrease in speed of the brake pulley 144 which will increase the speed of the take-up reel 130 and the tension on the twisted strands. From experiments it has been determined that it is possible to regulate satisfactorily the tension on the twisted strands without the use of the idler pulley 154 and the system of bell crank arms and connecting rods and by the use of the spring 150 only. The distributer screw and block being driven from the shaft which drives the take-up reel must necessarily operate when said shaft is rotated; and by properly adjusting the friction roller with respect to the friction disk, proper distribution of the twisted strands on the take-up reel will result.

In the manufacture of twisted pairs of conductors insulated with paper tape for use in electrical cables—such, for example, as telephone and telegraph cables,—there have been encountered a number of difficulties which prevent the obtaining of the maximum amount of efficiency from said cables. For example, slight differences in the diameter of the insulated conductors to be twisted together will cause inequalities in the twisted pair which, when said twisted pair is used in a cable, will result in causes of disturbance in the proper wroking of adjacent twisted pairs in the cable. Inequalities in the degree of hardness of the two wires to be twisted together when twisted on machines which have been heretofore in use, will also result in causes for disturbances in adjacent pairs of the cable in which said pair is placed. As a general rule with the twisting machines which have been in use, when the spools containing the conductors to be twisted are placed in the yokes, it has not been possible to properly adjust them so as to obtain equal tension upon both of the conductors, thereby causing an uneven twisting of the two conductors. This adjustment is frequently difficult to accomplish and it is of no uncommon occurrence for such a machine to produce a twisted pair, the two conductors of which are forced very close together, thereby crushing the insulation and increasing the capacity between conductors of said pair.

A twisting machine embodying this invention overcomes the difficulties which have been experienced with existing types of twisting machines, and in addition thereto has a number of other advantages, among which are the means of mounting the pulleys and pressure devices in the triangular shaped frame in such a manner that the belts may be readily changed without dismantling the twisting machine, the means provided for the ready adjustment of tension on the belts, the means provided for the ready changing of the grooved twister, and the structure of the pressure devices which makes possible the ready adjustment of the various parts thereof.

While this invention has been described in connection with a twisting machine for the twisting of insulated conductors for electric cables, such as telephone and telegraph cables, it will be apparent that it is applicable to twisting machines for other purposes, and the invention is, therefore, not limited to a machine for the twisting of conductors for electric cables.

I claim:

1. In combination, mechanism for twisting a plurality of strands, means for drawing the strands through said twisting mechanism, and speed equalizing means for the strands comprising two endless flexible members and means for causing said endless flexible members to engage the strands.

2. In combination, mechanism for twisting a plurality of strands, means for drawing the strands through said twisting mechanism, and means for equalizing the speed of the strands comprising two endless belts and pressure devices for causing said belts to grip the strands.

3. In combination, mechanism for twisting a plurality of strands, means for drawing the strands through said twisting mechanism, and means for equalizing the speed of the strands comprising two endless belts, pulleys over which said belts are passed and pressure devices for causing said belts to grip the strands.

4. In a machine for twisting strands, mechanism for equalizing the speed of the strands comprising two endless belts, a plurality of pulleys over which said belts are passed and pressure devices for causing said belts to grip the strands, each of said pressure devices comprising a bracket and a plurality of spring pressed rollers mounted on said bracket, said belts passing between said rollers and being forced together thereby.

5. In combination, mechanism for twisting a plurality of strands, means for drawing the strands through said twisting mechanism, speed equalizing means for the strands comprising two endless flexible members and means for causing said endless flexible members to engage said strands, and means for adjusting the tension on said endless flexible members.

6. In combination, a revolving frame for twisting a plurality of strands, means for drawing the strands through said frame, a triangular shaped frame mounted on said revolving frame, mechanism for equalizing the speed of the strands mounted in said triangular shaped frame comprising two endless belts, a plurality of pulleys over which said belts are passed, blocks slidably mounted in slots provided in said triangular shaped frame, each having mounted thereon one of said pulleys, and pressure devices for causing said belts to grip the strands; an adjustment screw and nut for adjusting the tension on said belts, and springs connecting said blocks with said adjustment nut.

7. In a machine for twisting strands, mechanism for equalizing the speed of the strands comprising two endless belts having grooves for engaging the strands, a plurality of pulleys over which said belts are passed, and pressure devices for forcing the belts together and causing the grooves thereof to engage the strands.

8. In a machine for twisting a plurality of strands, the combination of two endless belts, guides therefor and pressure devices for causing the strands to be engaged by and to drive said belts, whereby the speed of the strands is equalized.

9. In a machine for twisting a plurality of strands, the combination of two endless belts, guides therefor, and means for causing each of said belts to engage each of the strands, said belts being driven in the same direction by the strands, thereby causing the speed of the strands to be equalized.

10. In combination, mechanism for twisting a plurality of strands, means for drawing the strands through said twisting mechanism, and a spirally grooved device over which the strands are passed for forming a definite spiral in each strand.

11. In combination, mechanism for twisting a plurality of strands, means for drawing the strands through said twisting mechanism, and a rod provided with a plurality of spiral grooves through which the strands are passed for forming definite spirals therein.

12. In combination, mechanism for twisting a plurality of strands, means for drawing the strands through said twisting mechanism, speed equalizing means for the strands comprising two endless flexible members and means for causing said endless flexible members to engage the strands, and a grooved guide upon which the strands are twisted.

13. In combination, mechanism for twisting a plurality of strands, means for drawing the strands through said twisting mechanism, means for equalizing the speed of the strands comprising two endless belts and pressure devices for causing said belts to grip the strands, and a grooved guide upon which the strands are twisted.

14. In combination, mechanism for twisting a plurality of strands, means for drawing the strands through said twisting mechanism, means for equalizing the speed of the strands comprising two endless belts, pulleys over which said belts are passed, and pressure devices for causing said belts to grip the strands, and a grooved guide upon which the strands are twisted.

15. In a machine for twisting strands, mechanism for equalizing the speed of the strands comprising two endless belts, a plurality of pulleys over which said belts are passed and pressure devices for causing said belts to grip the strands, each of said pressure devices comprising a bracket and a plurality of spring pressed rollers mounted on said bracket, said belts passing between said rollers and being forced together thereby, and a grooved guide upon which the strands are twisted.

16. In combination, mechanism for twisting a plurality of strands, means for drawing the strands through said twisting mechanism, speed equalizing means for the strands comprising two endless flexible members and means for causing said endless flexible members to engage the strands, means for adjusting the tension on said flexible members, and a grooved guide upon which the strands are twisted.

17. In combination, a revolving frame for twisting a plurality of strands, means for drawing the strands through said frame, a triangular shaped frame mounted on said revolving frame, mechanism for equalizing the speed of the strands mounted in said triangular shaped frame, said mechanism comprising two endless belts, a plurality of pulleys over which said belts are passed, blocks slidably mounted in slots provided in said triangular shaped frame, each having mounted thereon one of said pulleys, and pressure devices for causing said belts to grip the strands, an adjustment screw and nut for adjusting the tension on said belts, springs connecting said blocks with said adjustment nut, and a grooved guide upon which the strands are twisted.

18. In a machine for twisting strands, mechanism for equalizing the speed of the strands comprising two endless belts having grooves for engaging the strands, a plurality of pulleys over which said belts are passed, and pressure devices for forcing the belts together and causing the grooves thereof to engage the strands, and a grooved guide upon which the strands are twisted.

19. In a machine for twisting a plurality of strands, the combination of two endless belts, guides therefor, pressure devices for causing the strands to be engaged by and to drive said belts, whereby the speed of the strands is equalized, and a grooved guide upon which the strands are twisted.

20. In a machine for twisting a plurality of strands, the combination of two endless belts, guides therefor, means for causing each of said belts to engage each of the strands, said belts being driven in the same direction by the strands, thereby causing the speed of the strands to be equalized, and a grooved guide upon which the strands are twisted.

21. In combination, mechanism for twisting a plurality of strands, means for drawing the strands through said twisting mechanism, speed equalizing means for said strands comprising two endless flexible members and means for causing said endless flexible members to engage the strands, and a rod provided with a plurality of grooves through which the strands are passed for forming spirals therein.

22. In combination, mechanism for twisting a plurality of strands, means for drawing the strands through said twisting mechanism, means for equalizing the speed of the strands comprising two endless belts and pressure devices for causing said belts to grip the strands, and a rod provided with a plurality of grooves through which the strands are passed for forming spirals therein.

23. In combination, mechanism for twisting a plurality of strands, means for drawing the strands through said twisting mechanism, means for equalizing the speed of the strands comprising two endless belts, pulleys over which said belts are passed, and pressure devices for causing said belts to grip the strands; and a rod provided with a plurality of grooves through which the strands are passed for forming spirals therein.

24. In a machine for twisting strands, mechanism for equalizing the speed of the strands comprising two endless belts, a plurality of pulleys over which said belts are passed, pressure devices for causing said belts to grip the strands, each of said pressure devices comprising a bracket and a plurality of spring pressed rollers on said bracket, said belts passing between said rollers and being forced together thereby; and a rod provided with a plurality of grooves through which the strands are passed for forming spirals therein.

25. In combination, mechanism for twisting a plurality of strands, means for drawing the strands through said twisting mechanism, speed equalizing means for the strands comprising two endless flexible members and means for causing said endless flexible members to engage the strands, means for adjusting the tension on said flexible members, and a rod provided with a plurality of grooves through which the strands are passed for forming spirals therein.

26. In combination, a revolving frame for twisting a plurality of strands, means for drawing the strands through said frame, a triangular shaped frame mounted on said revolving frame, mechanism for equalizing the speed of the strands mounted in said triangular shaped frame comprising two endless belts, a plurality of pulleys over which said belts are passed, blocks slidably mounted in slots provided in said triangular shaped frame, each having mounted thereon one of said pulleys, and pressure devices for causing said belts to grip the strands; an adjustment screw and nut for adjusting the tension on said belts, springs connecting said blocks with said adjustment nut, and a rod provided with a plurality of grooves through which the strands are passed for forming spirals therein.

27. In a machine for twisting strands, mechanism for equalizing the speed of the strands comprising two endless belts having grooves for engaging the strands, a plurality of pulleys over which said belts are passed and pressure devices for forcing the belts together and causing the grooves thereof to engage the strands, and a rod provided with a plurality of grooves through which the strands are passed for forming spirals therein.

28. In combination, mechanism for twisting a plurality of strands, means for drawing the strands through said twisting mechanism, and speed equalizing means for the strands comprising endless flexible means and means for causing said endless flexible means to engage the strands.

29. In combination, mechanism for twisting a plurality of strands, means for drawing the strands through said twisting mechanism, speed equalizing means for the strands comprising endless flexible means and means for causing said endless flexible means to engage said strands, and means for adjusting the tension on said endless flexible means.

30. In combination, means for forming definite spirals in each of a plurality of strands, mechanism for twisting the strands together, and means for drawing the strands through said twisting mechanism.

In witness whereof, I hereunto subscribe my name this 26 day of September A. D., 1913.

WILLIAM F. SMITH.

Witnesses:
R. R. IRELAND,
A. PRUESSMAN.